(12) United States Patent
Bagni et al.

(10) Patent No.: US 6,483,928 B1
(45) Date of Patent: Nov. 19, 2002

(54) SPATIO-TEMPORAL RECURSIVE MOTION ESTIMATION WITH 1/2 MACROBLOCK AND 1/4 PIXEL UNDERSAMPLING

(75) Inventors: Daniele Bagni, Olgiate Molgora (IT); Davide Giovenzana, Monza (IT); Luca Pezzoni, Cormano (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 09/527,631

(22) Filed: Mar. 17, 2000

(30) Foreign Application Priority Data

Mar. 18, 1999 (IT) .......................................... VA99A0006

(51) Int. Cl.$^7$ ................................................. G06K 9/40
(52) U.S. Cl. ....................................... 382/107; 382/232
(58) Field of Search ............................ 345/473; 382/236, 382/232, 107; 348/390, 419, 416, 699

(56) References Cited

U.S. PATENT DOCUMENTS

| | | | | |
|---|---|---|---|---|
| 5,600,731 A | * | 2/1997 | Sezan et al. ................. | 382/107 |
| 5,703,966 A | * | 12/1997 | Astle ........................... | 382/236 |
| 5,764,293 A | * | 6/1998 | Uz et al. ...................... | 348/390 |
| 5,878,166 A | * | 3/1999 | Legall ......................... | 382/232 |
| 6,014,181 A | * | 1/2000 | Sun ............................. | 348/699 |
| 6,058,210 A | * | 1/2000 | de Queiroz .................. | 382/232 |
| 6,122,320 A | * | 9/2000 | Bellifemine et al. ......... | 375/240 |
| 6,337,917 B1 | * | 1/2002 | Onural et al. ................ | 382/107 |

\* cited by examiner

*Primary Examiner*—Mark Zimmerman
*Assistant Examiner*—Huedung X. Cao
(74) *Attorney, Agent, or Firm*—Lisa K. Jorgenson; Allen, Dyer, Doppelt, Milbrath & Gilchrist, P.A.

(57) ABSTRACT

Through a comparison of the values of pixels of a first candidate predictor macroblock having pixels in homologous positions to those of a reference macroblock of identical position on the frame to that of the macroblock being estimated on a reference frame of the present sequence of picture frames, a pre-established cost function is evaluated for each comparison. The best predictor is the one producing the minimum value of cost function. The comparison may even include the summing to each predictor candidate of an update vector of smaller dimensions than the macroblocks, chosen among a plurality of pre-established update vectors, for accelerating the convergence process of the comparison.

20 Claims, 6 Drawing Sheets

MOTION ESTIMATION ARCHITECTURE

| pred0 | pred1 | pred2 |
|-------|-------|-------|
| pred3 |       | pred4 |
| pred5 | pred6 | pred7 |
| pred8 | pred9 | pred10 |

▨ 2 PRESENCES

▧ 1 PRESENCE

☐ 0 PRESENCES

☐ INTEGER PIXEL POSITION
○ HALF PIXEL POSITION a=A
b=(A+B+1)/2
c=(A+C+1)/2
d=(A+B+C+D+2)/4

FIG. 9.

(a) NO UNDERSAMPLING (b) 1/4 UNDERSAMPLING (c) 1/4 UNDERSAMPLING

SPATIO-TEMPORAL RECURSIVE MOTION ESTIMATION WITH 1/2 MACROBLOCK AND 1/4 PIXEL UNDERSAMPLING

FIELD OF THE INVENTION

The present invention relates to digital processing systems of video images, and in particular, to systems for decoding sequences of compressed pictures by motion prediction and motion compensation algorithms, and to a method of motion estimation.

BACKGROUND OF THE INVENTION

The spatio-temporal recursive estimation was disclosed for the first time in the article G. de Haan, P. W. A. C. Biezen, H. Huijgen, O. A. Ojo, "True motion estimation with 3-D recursive search block matching", IEEE Trans. Circuits and Systems for Video Technology, Vol. 3, October 1993, pp. 368–379. Instead of carrying out several comparisons (matching errors), the vectors that guarantee the best spatial coherence of the vector field are singled out among vectors associated to the neighboring macroblocks of the current macroblock; such vectors are called "spatial predictors". Even "temporal predictors" can be used, that is vectors calculated for pairs of preceding pictures, in order to have a temporal coherent vector field.

Following this approach, a new algorithm has been realized for H.263 applications, described in European Patent Applications 97402763.3 and 98200461.6.

Basic Principles

In motion estimation algorithms of the block-matching kind, a displacement vector (often unproperly called motion vector) $d(b_c, t)$ is assigned to the middle $$b_c = (x_c, y_c)^{tr}$$

of a block of pixels $B(b_c)$, of the current picture $I(x,t)$, where tr stands for "transposed". This assignment is carried out if $B(b_c)$ has a good correlation, or matching, with a similar block inside a search area $SA(b_c)$, also centered on $b_c$, but belonging to the preceding picture, $I(x,t-T)$, where T is time interval between the two pictures being coded, which corresponds to an integer multiple n of the period $Tq=40$ ms for PAL sequences or 30 ms for NTSC sequences. The center of such a similar block will be shifted in respect to $b_c$ by the motion vector $d(b_c, t)$.

Figure 1:
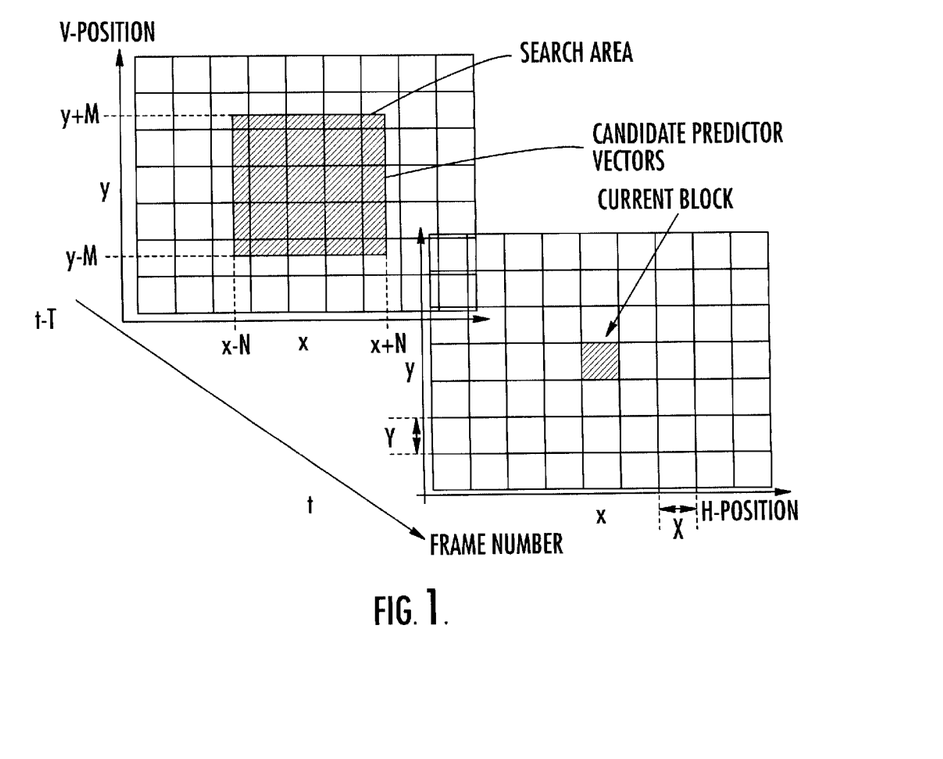
FIG. 1 is a diagram showing the transposition of the macroblocks according to the motion estimation algorithm.

A number of candidate vectors C are tested, measuring an error $e(C, b_c, t)$ to quantify similarities among the considered blocks, in order to find $d(b_c, t)$. A diagram illustrating such a procedure is depicted in FIG. 1.

Pixels inside the $B(b_c)$ block have the following positions:

$$(x_c - X/2 \leq x \leq x_c + X/2)$$

$$(y_c - Y/2 \leq y \leq y_c + Y/2)$$

where X is the block length and Y is the block height (both equal to 16 for MPEG-1, MPEG-2 and H.263) and $x=(x,y)^{tr}$ is its spatial position on the picture.

Candidate vectors are selected within the set of candidates $CS(b_c, t)$ determined by:

$$CS(b_c, t) = \left\{ \begin{array}{l} \left( d\left(b_c - \binom{X}{Y}\right), t \right) + U_1(b_c), \\ \left( d\left(b_c - \binom{-X}{Y}\right), t \right) + U_2(b_c), \\ d\left(b_c - \binom{0}{-2Y}\right), t - T \right) \end{array} \right\} \quad (1)$$

where the update vectors $U_1(b_c)$ e $U_2(b_c)$ are randomly selected from a set of updates US, defined by:

$$US(b_c) = US_i(b_c) \cup US_f(b_c)$$

where integer updates $USi(b_c)$ are given by:

$$US_f(b_c) = \left\{ \begin{array}{l} \binom{0}{0}, \\ \binom{0}{1}, \binom{0}{-1}, \binom{1}{0}, \binom{-1}{0}, \\ \binom{0}{2}, \binom{0}{-2}, \binom{2}{0}, \binom{-2}{0}, \\ \binom{0}{3}, \binom{0}{-3}, \binom{3}{0}, \binom{-3}{0} \end{array} \right\} \quad (2)$$

Update vectors $US_f(b_c)$, necessary to realize a ½ pixel accuracy, are given by:

$$US_f(b_c) = \left\{ \binom{0}{\frac{1}{2}}, \binom{0}{-\frac{1}{2}}, \binom{\frac{1}{2}}{0}, \binom{-\frac{1}{2}}{0} \right\} \quad (3)$$

Both $U_1(b_c)$ and $U_2(b_c)$ contain the zero update vector $$\binom{0}{0}.$$

Figure 2:
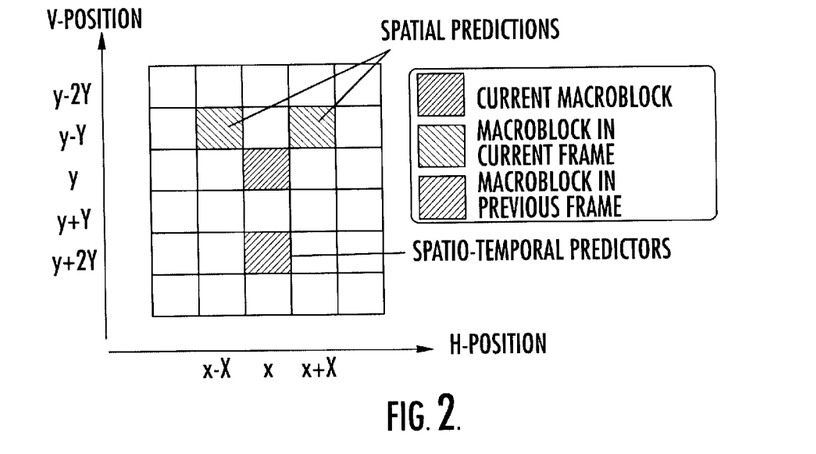
FIG. 2 shows the positions of predictor vectors or macroblocks relative to the current macroblock.

From these equations it may be said that the set of candidates is constituted by temporal and spatial predictors, taken from a 3-D set and from an update prediction vector. This procedure implicitly makes the vector field spatially and temporally consistent. The updating process includes adding updates from time to time to one of the two spatial predictors. The positions of the spatial predictors and spatio-temporal predictors in respect to the current block are show in FIG. 2.

The displacement vector $d(b_c, t)$ resulting from the block-matching process, is a candidate vector C that produces the lowest value of the following error function $e(C, b_c, t)$:

$$d(b_c, t) = \{C \in CS | e(C, b_v, t) \leq e(V, b_v, t)) \ \forall (V \in CS(b_c, t))\} \quad (4)$$

The error function is based on the difference of luminance values of the current block of the current picture $I(x,t)$ and of those of the block shifted from the picture $I(x-C, t-T)$, summed over the block $B(b_c)$. A typical choice, which is also adopted here, is that of the sum of the absolute differences (SAD). The error function is then given by:

$$e(C, b_c, t) = SAD(C, b_c, t) \quad (5)$$

$$= \sum_{x \in B(b_c)} |I(x, t) - I(x - C, t - T)|$$

It could be possible to adapt the updates distribution to the calculated errors, as done in SLIMPEG, such that the lower the errors are the more concentrated the distribution is, while the greater the errors are the more dispersed the distribution is. Nevertheless such a distribution strongly depends on the sequences used to calculate them. In the H.263, the bit-rate and above all the frame-rate is strongly variable (i.e. the frame rate in MPEG-2 is constant, while in H.263 is not) therefore it would be very difficult to define appropriate "training" sequences.

Iterative Estimation

In order to further improve the consistency of the vector field, the motion estimation is iterated m times (m=4 at most) on the same pair of pictures, by using the vectors calculated in the preceding iteration as temporal predictors of the current iteration. During the first and the third iteration, pictures are scanned in video scan-raster mode, that is from top to bottom and from left to right (as they are usually displayed on a TV screen). On the contrary, during the second and fourth iterations, pictures are scanned in the opposite direction, from bottom to top and from right to left. This is made possible by storing the pictures in a SDRAM (in fact if they were stored in a FIFO, only the scan-raster scanning would be possible).

Candidates vectors are selected from a new set of candidates CS' ($b_c$, t), which is defined by:

$$CS'(b_c, t) = \left\{ \begin{array}{l} \left( d\left( b_c - \binom{X}{(-1)^{i+1}Y} \right), t \right) + U_1(b_c), \\ \left( d\left( b_c - \binom{-X}{(-1)^{i+1}Y} \right), t \right) + U_2(b_c), \\ \left( d\left( b_c - \binom{0}{(-1)^i 2Y} \right), t - T/i \right) \end{array} \right.$$

where i is the number of the current iteration and $d(b_c, t-T/i)$ is the d in the preceding iteration (i-1), or, for each first iteration on a new pair of pictures, the last iteration on the preceding pair. The computing complexity of this estimator is practically constant when the frame rate changes, in fact the number of iterations for each pair of pictures varies according to the length of the time interval among said pictures. The case $n^3 \geq 5$ is not considered because the controller of the bit-rate is supposed to be unlikely to decide jumping by 4 consecutive pictures (but it could happen).

Macroblocks Undersampling

Figure 3:
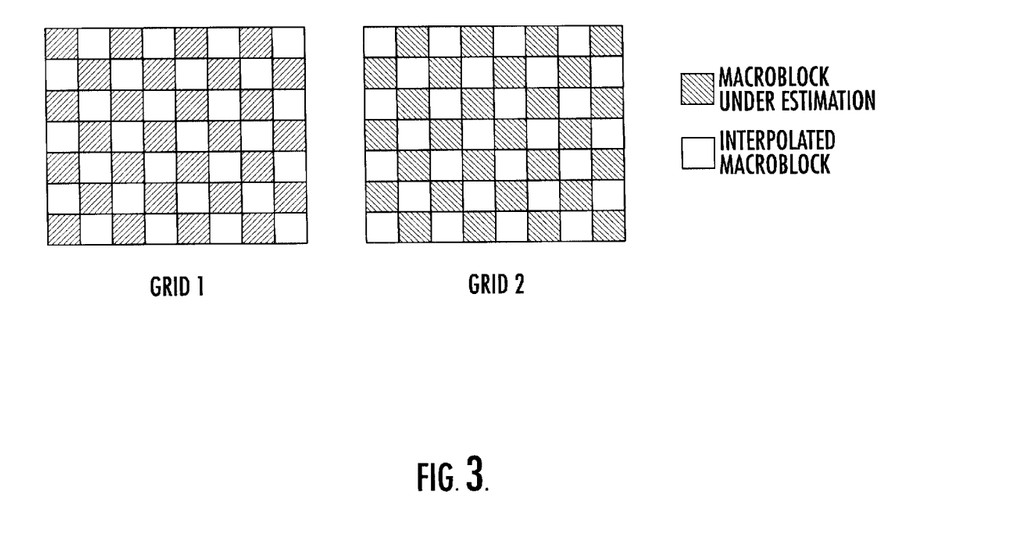
FIG. 3 shows two macroblock undersampling grids.

The computing complexity of the motion estimation could be decreased, by halving the number of macroblocks on which vectors are calculated with the technique described in the article G. de Haan, P. W. A. C. Biezen, "Sub-pixel motion estimation with 3-D recursive block-matching", Signal Processing: Image Communication 6 (1995), pp. 485–498. The grid of undersampled macroblocks has typically a quincunx shape pattern (as depicted in FIG. 3).

If the vector $d_m = d(b_c, t)$ is missing, it can be calculated from horizontally adjacent vectors $d_a$, according to the following table:

| Time interval T = nTq | Skipped Images | iterations |
|---|---|---|
| n = 1 | 0 | 0 |
| n = 2 | 1 | 2 |
| n = 3 | 2 | 3 |
| n = 4 | 3 | 4 |

$$Dm = \text{median}(d_l, d_r, d_{av}) \quad (6)$$

where $$d_l = d_a\left( b_c - \binom{X}{0}, t \right)$$

$$d_r = d_a\left( b_c + \binom{X}{0}, t \right)$$

$$d_{av} = \frac{1}{2}(d_t + d_b)$$

and $$d_t = d_a\left( b_c - \binom{X}{0}, t \right)$$

$$d_b = d_a\left( b_c - \binom{X}{0}, t \right)$$

The median interpolating filter acts separately on both the horizontal and vertical components of adjacent vectors. The undersampling grid is changed from one iteration to the other to calculate in a finer manner the vectors that in the preceding interpolation where interpolated.

The H.263 Standard

The H.263 standard is very similar to the older MPEG2 standard: an usual hybrid video coding DPCM/DCT is present, with temporal prediction. Nevertheless H.263 presents few novelties: the three Optional Mode known as APM, UMV, PB-frames, which allow a motion estimation even on 8×8 blocks instead of 16×16 blocks, and a more sophisticated motion compensated interpolation. In the present context, an application of the H.263, that is the motion estimation and the temporal prediction for P-frames, is considered.

The reference H.263 coder, known as TMN5 and produced by Telenor, has a "full search" block matching estimator, with a 30×30 pixels search window centered on the corresponding macroblock of the preceding frame. Around this macroblock the full search carries out a spiral search. This is a very burdensome estimation technique because the calculation of the SAD must be carried out for each position among 30×30 possible ones. In real time applications such as videophone and videoconference for which the H.263 standard was developed, a reduction the computing complexity is very important even accounting for an acceptable decrease of the quality of images.

SUMMARY OF THE INVENTION

An object of the present invention is to strongly reduce the computing complexity, and retain a substantially undegraded quality of the pictures with the same compression.

It has been found that a non-negligible reduction of the computing complexity may be achieved by slightly increasing the bit-rate because of an increase of the prediction error, while benefitting from a shorter processing delay.

A method of motion estimation in an encoding system based on the prediction of motion compensated pictures, comprises, as it is well known, identifying the best predictor macroblock or predictor vector among pre-established prediction candidate macroblocks chosen among those that are spatially distributed around or near the macroblock under estimation on the same frame and that precede it in the order of scanning and pre-established predictor candidate macroblocks chosen among those that are spatially/temporally distributed around or near the macroblock under estimation and that follow it in the scanning order on picture frames that immediately temporally precede the frame of the macroblock under estimation.

Through a comparison algorithm of the values of pixels of a first candidate predictor macroblock having pixels in homologous positions to those of a reference macroblock of identical position on the frame to that of the macroblock being estimated on a reference frame of the present sequence of picture frames, a pre-established cost function is evaluated for each comparison. The best predictor is the one producing the minimum value of cost function. The algorithm may even comprise the summing to each predictor candidate of an update vector of smaller dimensions than the macroblocks, chosen among a plurality of pre-established update vectors, for accelerating the convergence process of the algorithm.

A method aspect of the invention includes comparing predictor candidate macroblocks and comparing, with the reference macroblock, and in calculating the cost function, only predictor macroblocks having different components among each other. According to a preferred embodiment, the method further contemplates that the calculation of the cost function for each predictor candidate macroblock is carried out on a reduced number of pixels of the macroblock, chosen according to a certain checkerboard undersampling scheme down to ¼ the number of pixels.

A further reduction of the computing complexity is obtained by carrying out motion estimation on a reduced number of macroblocks of each frame, chosen according to a first checkerboard selection scheme and to a second checkerboard selection scheme of macroblocks of temporally consecutive frames of the sequence, and by operating a median filtering for determining a deselected macroblock of the current frame as a median value among horizontally adjacent macroblocks and the average of macroblocks vertically adjacent to the deselected macroblock.

DETAILED DESCRIPTION OF THE PREFERRED EMBODIMENTS

The invention tends to reduce the computing complexity of motion estimation for the same PSNR (Peak Signal Noise Ratio). The considered bit-rate is the one output by the H.263 coder and the PSNR, as calculated by the coder, is defined as:

$$PSNR = 10\log\left\{\sum_{i,j} \frac{255^2}{\frac{1}{N}[x_{i,j} - \hat{x}_{i,j}]^2}\right\} \quad (7)$$

where $x_{i,j}$ is the pixel of the original picture, $x'_{i,j}$ is the pixel of the reconstructed picture and N is the pixel number of the picture that depends on the chosen format (the CIF format in the considered case).

Figure 4:
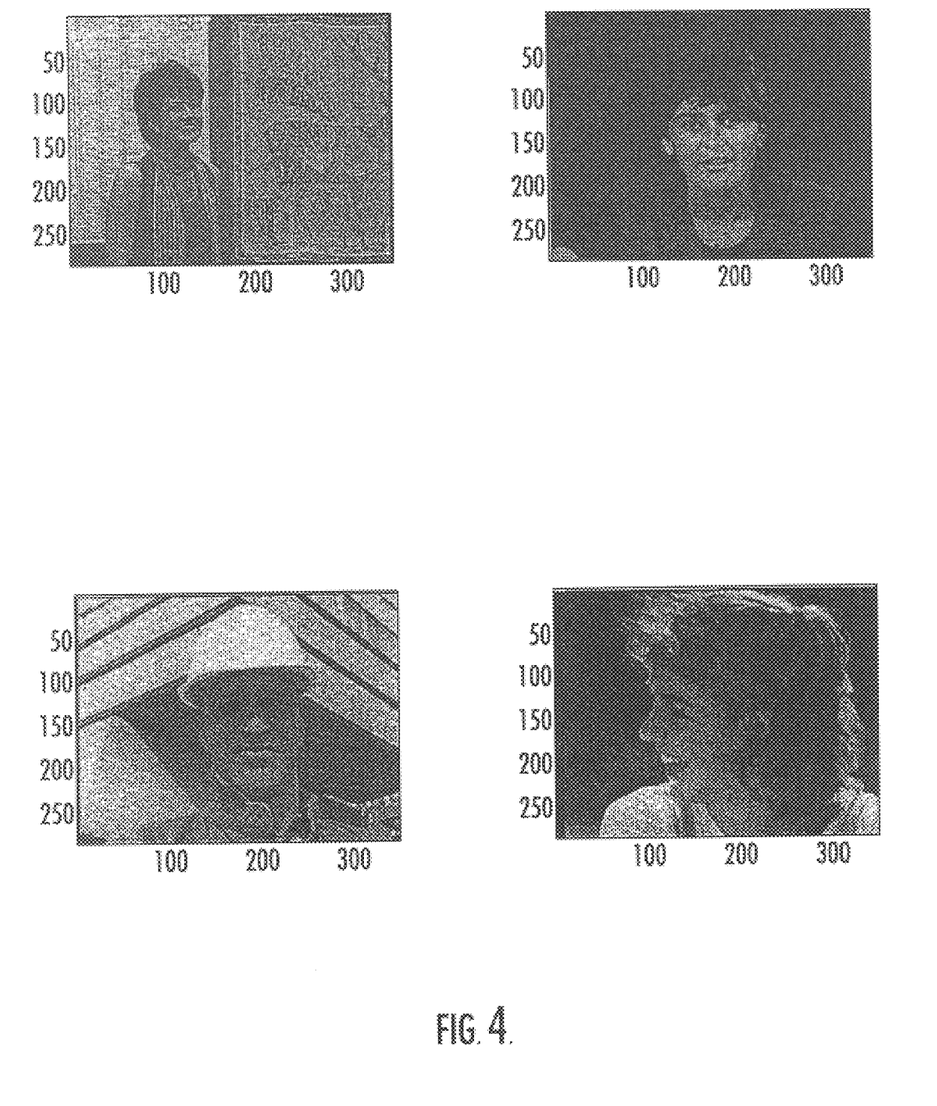
FIG. 4 shows the four CIF sequences considered.

In order to carry out subjective and objective tests, the four test sequences with different characteristics from the view point of the motion field depicted in FIG. 4 have been used. In the Renata sequence there is an horizontal transfer motion of a girl, quite accentuated but uniform and so expectable by a recursive estimator. The Miss America sequence is a typical videoconference sequence, with a motion rate undoubtedly low (the face in foreground) and a stationary background. The Foreman sequence produces a dishomogeneous vector field, because of a rapid motion of the close-up person together with a vertical pan of the camera. In the Teeny sequence motion is even more accentuated and unexpectable: in particular the girl's head, which occupies a non marginal portion of the scene, has an accelerated rotational motion.

Spatial and Temporal Predictors

The choice of the candidates to use has been tied to statistics of the most recurrent candidates. To this end, the 4 test sequences have been used with different quantization steps (QP=10, QP=15, QP=20, QP=25, QP=30) and with different frame rates (f=25 Hz, f=12.5 Hz, f=8.33 Hz, f=6.25 Hz). The set of predictors surrounding the macroblock being estimated that have been considered is highlighted in FIG. 5. A statistic of the "winning" predictors has been realized, where "winning" stands for the predictor that minimizes the cost function SAD. So it has been possible to reduce the set to the most recurrent candidates.

Figure 5:
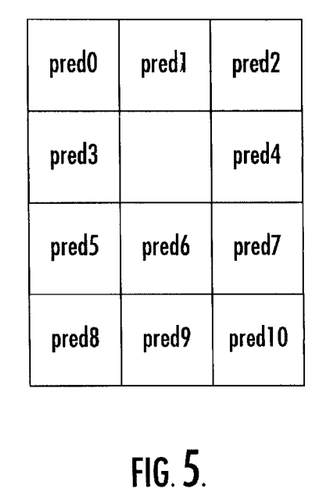
FIG. 5 shows the set of analyzed predictors.

The percentages relative to the various predictors of FIG. 5 are indicated in Tab. 2.

TABLE 2

| predictor | percentage (%) |
|---|---|
| Pred0 | 31.78 |
| Pred1 | 37.76 |
| Pred2 | 19.40 |
| Pred3 | 35.37 |
| Pred4 | 28.42 |
| Pred5 | 25.52 |

TABLE 2-continued

| predictor | percentage (%) |
|---|---|
| Pred6 | 30.56 |
| Pred7 | 27.62 |
| Pred8 | 23.41 |
| Pred9 | 26.60 |
| Pred10 | 25.05 |

The sum of all the percentages surpasses unity. This is due to the fact that it is possible to have winning predictors that are equal to each other, thus incrementing the percentage of all these predictors. Indeed, one is confronted with a statistic according to which for each macroblock there may be a plurality of choices. By progressively discarding (i.e. not elaborating) the least recurrent candidate, a small worsening of performances in respect to a non-negligible computing reduction has been observed.

Figure 6:
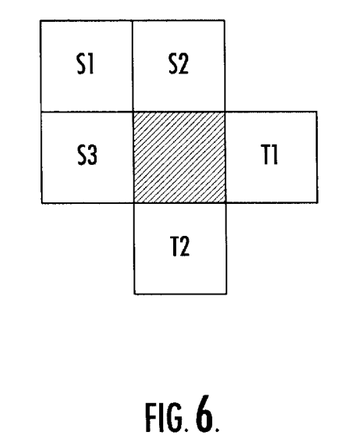
FIG. 6 shows the spatial distribution of the chosen spatial and temporal candidates.

The five most probable predictors have been chosen, as shown in FIG. 6. The chosen predictor candidate macroblocks are three spatial predictors S1, S2 and S3 and two temporal predictors T1 and T2, corresponding to pred0, pred1, pred3, pred4, pred6 of FIG. 5, respectively. As expected, the candidates around the examined block are recurrent, because of the spatio-temporal coherence of motion of adjacent blocks. In addition to the four cross predictors, a fifth spatial predictor (S1) presenting a normalized distance from the estimated macroblock equal to the square root of two is added.

By using a notation similar to that of Chapter 3, it is possible to identify the set of the chosen candidates: from top to bottom the predictors S1, S2, S3, T1, and T2 of FIG. 6 are written in a mathematical form.

$$S1 = d\left(b_c - \begin{pmatrix} X \\ Y \end{pmatrix}, t\right)$$

$$S2 = d\left(b_c - \begin{pmatrix} 0 \\ Y \end{pmatrix}, t\right)$$

$$S3 = d\left(b_c - \begin{pmatrix} X \\ 0 \end{pmatrix}, t\right)$$

$$T1 = d\left(b_c - \begin{pmatrix} -X \\ 0 \end{pmatrix}, t - T\right)$$

$$T1 = d\left(b_c - \begin{pmatrix} -N \\ -Y \end{pmatrix}, t - T\right)$$

H.263 Predictor as a Candidate

Figure 7:
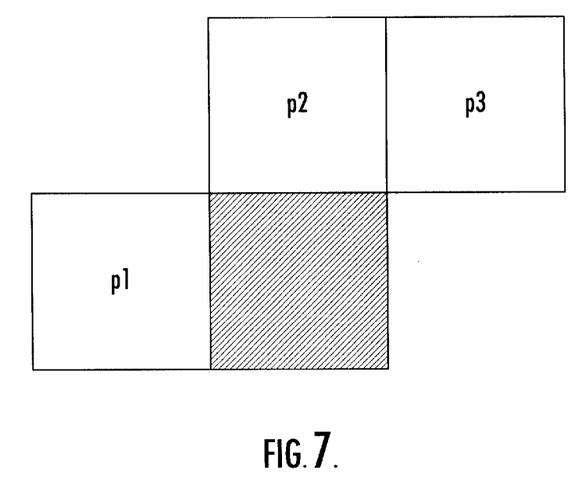
FIG. 7 shows the distribution of the predictor according to the H.263 standard.

In addition to the temporal and spatial candidates, the predictor H.263 has also been included within the candidates to test. This option is typical only for a H.263 coder, while it is clearly not mandatory for an MPEG2 coder. The standard expects the coding of the difference between the vector of the current macroblock and its H.263 predictor, whose components are equal to the median value among the components of three motion vectors p1, p2 and p3 relative to macroblocks surrounding the current one (see FIG. 7):

$pmv_x$=median $(p1_x, p2_x, p3_x)$ $pmv_y$=median $(p1_y, p2_y, p3_y)$

If, among the considered candidates, the predictor H.263 is the winning one, then no bit must be spent for coding the motion vector. Such an extremely convenient situation happens especially in case of locally uniform vector field.

Updates

Update is intended to define a vector of relatively small dimensions that is summed to one of the predictor candidates. It has been decided to extract in a random manner the update from a 16 elements table. In so doing, in case of a sudden and "unexpected" motion by the spatial and temporal predictors, the algorithm is allowed to converge more rapidly.

Figure 8:
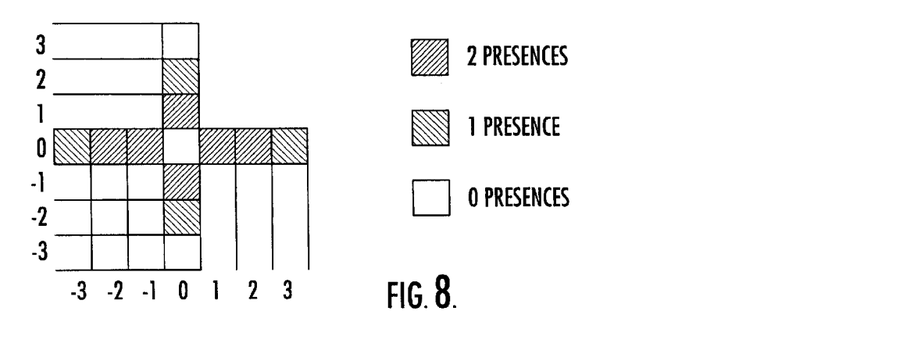
FIG. 8 shows the scheme of the update table.

The chosen table is the one of FIG. 8. In this table sixteen vertical and horizontal updates, listed herebelow, are present:

$$Us_i(b_c) = \left\{ \begin{array}{l} \begin{pmatrix} -2 \\ 0 \end{pmatrix}, \begin{pmatrix} 0 \\ 1 \end{pmatrix}, \begin{pmatrix} 1 \\ 0 \end{pmatrix}, \begin{pmatrix} 0 \\ -2 \end{pmatrix}, \\ \begin{pmatrix} 3 \\ 0 \end{pmatrix}, \begin{pmatrix} 0 \\ 2 \end{pmatrix}, \begin{pmatrix} -1 \\ 0 \end{pmatrix}, \begin{pmatrix} 0 \\ -1 \end{pmatrix}, \\ \begin{pmatrix} -3 \\ 0 \end{pmatrix}, \begin{pmatrix} 0 \\ 1 \end{pmatrix}, \begin{pmatrix} 1 \\ 0 \end{pmatrix}, \begin{pmatrix} -2 \\ 0 \end{pmatrix}, \\ \begin{pmatrix} 2 \\ 0 \end{pmatrix}, \begin{pmatrix} 2 \\ 0 \end{pmatrix}, \begin{pmatrix} -1 \\ 0 \end{pmatrix}, \begin{pmatrix} 0 \\ -1 \end{pmatrix} \end{array} \right\} \quad (8)$$

The update is summed to the two predictors S2 and T2 of FIG. 6, where the first one is spatial and the second one is temporal.

Finally, it has been chosen to sum to each predictor S2 and T2 a random update taken from a table wherein horizontal displacements are privileged as compared to vertical displacements. It must be noted that in the used table, which presents an integer precision, small displacements (a pixel in both directions and two pixels only in horizontal direction) occur twice. Such a strategy tends to make more probable small displacements around the examined macroblock, though not excluding larger displacements. In the update table a trade-off between the refining of the recursive estimation and the acceleration of the convergence has been sought.

Iterations

The H.263 encoder expects a variable containing the number of "skipped" frames during the coding, in respect to the reference frame rate, equal to 25 Hz. In fact, the distance between two uncoded pictures is equal to Tq=40 ms, if a 50 Hz interlaced video camera is used and if a conversion in a progressive format is carried out. A high "skipping" factor (up to a maximum of 4 frame periods) implies a lowering of the frequency at which the pictures to encode are acquired: as a consequence, the temporal distance between two successive frames processed by the encoder expands.

The consequence is that motion is very accentuated in sequences characterized by displacements of portions of the scene caused by pan and zoom. The recursive estimator could have problems in tracking the motion. The adopted solution is the introduction of the concept of iteration. The estimation is repeated several times between two reference frames. The motion vectors that in the first iteration where temporal predictors (because of the estimation between the preceding co-decoded picture and the present picture), become spatial predictors in the following iteration. A valid compromise among such two contrasting requirements has been reached by choosing: an iteration for frame frequencies of 25 Hz and 12.5 Hz; two iterations for frame frequencies of 8.33 Hz and 6.25 Hz. It has also been judged useful to execute two "scannings" (always in the scan-raster mode), namely, from top to bottom and from left to right only in the case that two or three pictures among the pair of frames to code are skipped.

Equal Predictors Situation

According to the algorithm of the invention, the recursive estimation often produces the same predictors candidates. It would be useless and expensive to carry out the SAD calculations for all the nine predictors if many of them present the same components. It is enough to carry it out only for the different ones. In this way, the computational saving becomes more accentuated for sequences characterized by a locally uniform field. In particular, the mean number of different predictors among the nine candidates is reported in the following table, for the four test sequences and for different frame-rates.

TABLE 3

| Sequence | F = 25 Hz | F = 12.5 Hz | F = 8.33 Hz | F = 6.25 Hz |
|---|---|---|---|---|
| Renata | 419 | 498 | 523 | 549 |
| Miss America | 502 | 542 | 582 | 59 |
| Foreman | 546 | 644 | 648 | 659 |
| Teeny | 585 | 641 | 654 | 658 |

The estimation carried out only on different candidates has a cost. Each predictor must be compared with the preceding ones; only if both its components are different from the components of the already examined candidates the estimation is carried out. The evaluation of the cost function only on different vectors is an advantageous solution because the number of different predictors is equal to six over nine in the worst case of the Teeny sequence. The saving achieved by avoiding the calculation of three SAD is generally much more significant of the added cost due to a prior verification of differences between predictors.

Half Pixel Search

Figure 9:
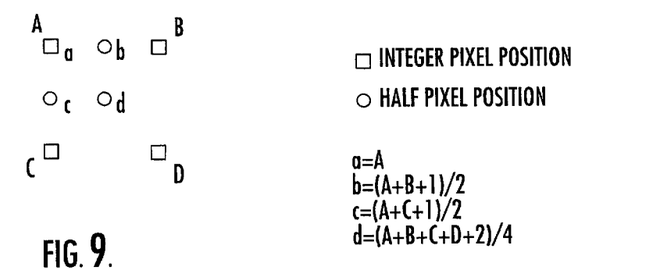
FIG. 9 shows the scheme of bilinear interpolation for a ½ pixel prediction.

The H.263 standard contemplates the possibility of coding motion vectors with a half pixel precision, thus allowing to generate a vector field more similar to the real motion present on the scene. Motion vectors with integer precision are determined, either when there is only one iteration as well as when there are two iterations. At the end of this first phase a second one starts, in which for each macroblock a half pixel refinement is carried out on the 8 positions surrounding the previously estimated integer precision vector. To do this, it is necessary to work on the previously reconstructed frame interpolated according the formulas of FIG. 9. The position among the 9 possible ones (also including the starting position) that minimizes the matching error among macroblocks of the two examined pictures is chosen.

The adopted solution tends to have the estimator converge rapidly, even if on rather coarse vectors, and to refine the estimation in a second step with a half pixel precision.

¼ Pixel Undersampling

In this phase, the objective of maximizing the computational saving is attained by considering a set of pixels of a smaller macroblocks than the conventional 16×16 ones for calculating the cost function. In particular in FIG. 10, wherein for sake of simplicity the dimensions of the macroblock is 8×8, there are: conventional 16×16 area [256 pixels]; 16×16 area with ¼ pixel undersampling according to an alternate rows checkerboard pattern [64 pixels]; and 16×16 area with ¼ pixel undersampling and alternation of row and column [64 pixels].

Figure 10:
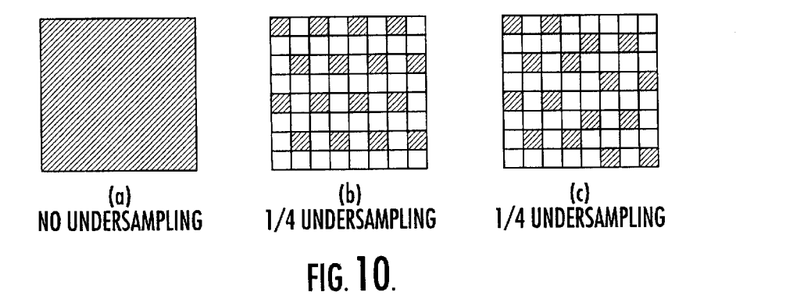
FIG. 10 shows alternative ¼ pixel undersampling grids.

Based on the results of simulations, solutions (b) and (c), with a ¼ pixel undersampling, show similar performances to the first one (in terms of PSNR and bit-rate) with a four-time reduction of computations in respect to the conventional case (a). The PSNR and the bit-rate for the four test sequences, for different frequencies (f=25 Hz, f=12.5 Hz, f=8.33 Hz, f=6.25 Hz) and for different quantization steps (QP=10 and QP=20), are reported in tables 4, 5 and 6.

TABLE 4

| | Renata f = 25 Hz | | Renata f = 12.5 Hz | | Renata f = 8.33 Hz | | Renata f = 6.25 Hz | |
|---|---|---|---|---|---|---|---|---|
| | PSNR | bitrate | PSNR | bitrate | PSNR | bitrate | PSNR | bitrate |
| QP = 10 | 29.53 | 890.31 | 29.53 | 542.28 | 29.49 | 391.75 | 29.49 | 330.36 |
| QP = 20 | 25.55 | 308.00 | 25.53 | 193.86 | 25.51 | 142.84 | 25.47 | 121.57 |
| | Miss f = 25 Hz | | Miss f = 12.5 Hz | | Miss f = 8.33 Hz | | Miss f = 6.25 Hz | |
| | PSNR | bitrate | PSNR | bitrate | PSNR | bitrate | PSNR | bitrate |
| QP = 10 | 37.41 | 132.21 | 37.37 | 79.11 | 37.33 | 60.40 | 37.28 | 50.33 |
| QP = 20 | 35.46 | 100.51 | 35.42 | 58.08 | 35.41 | 44.01 | 35.30 | 35.82 |
| | Foreman f = 25 Hz | | Foreman f = 12.5 Hz | | Foreman f = 8.33 Hz | | Foreman f = 6.25 Hz | |
| | PSNR | bitrate | PSNR | bitrate | PSNR | bitrate | PSNR | bitrate |
| QP = 10 | 32.84 | 307.51 | 32.70 | 206.20 | 32.65 | 156.31 | 32.52 | 136.87 |
| QP = 20 | 29.94 | 148.49 | 29.73 | 101.42 | 29.69 | 75.74 | 29.57 | 66.60 |
| | Teeny f = 25 Hz | | Teeny f = 12.5 Hz | | Teeny f = 8.33 H | | Teeny f = 6.25 Hz | |
| | PSNR | bitrate | PSNR | bitrate | PSNR | bitrate | PSNR | bitrate |
| QP = 10 | 32.84 | 740.38 | 32.70 | 499.30 | 32.57 | 375.45 | 32.48 | 314.44 |
| QP = 20 | 29.15 | 323.42 | 26.86 | 229.04 | 28.73 | 173.14 | 28.60 | 148.13 |

TABLE 5

|  | Renata f = 25 Hz | | Renata f = 12.5 Hz | | Renata f = 8.33 Hz | | Renata f = 6.25 Hz | |
| --- | --- | --- | --- | --- | --- | --- | --- | --- |
|  | PSNR | bitrate | PSNR | bitrate | PSNR | bitrate | PSNR | bitrate |
| QP = 10 | 29.50 | 939.90 | 29.50 | 569.42 | 29.45 | 411.78 | 29.44 | 345.78 |
| QP = 20 | 25.45 | 340.53 | 25.44 | 212.43 | 25.40 | 155.45 | 25.35 | 132.30 |
|  | Miss f = 25 Hz | | Miss f = 12.5 Hz | | Miss f = 8.33 Hz | | Miss f = 6.25 Hz | |
|  | PSNR | bitrate | PSNR | bitrate | PSNR | bitrate | PSNR | bitrate |
| QP = 10 | 37.28 | 140.21 | 37.23 | 80.42 | 37.22 | 62.24 | 37.14 | 51.49 |
| QP = 20 | 35.30 | 105.40 | 35.28 | 57.73 | 35.26 | 44.97 | 35.15 | 35.83 |
|  | Foreman f = 25 Hz | | Foreman f = 12.5 Hz | | Foreman f = 8.33 Hz | | Foreman f = 6.25 Hz | |
|  | PSNR | bitrate | PSNR | bitrate | PSNR | bitrate | PSNR | bitrate |
| QP = 10 | 32.74 | 327.78 | 32.60 | 220.69 | 32.54 | 165.26 | 32.46 | 142.45 |
| QP = 20 | 29.79 | 156.08 | 29.60 | 105.26 | 29.57 | 78.65 | 29.42 | 68.72 |
|  | Teeny f = 25 Hz | | Teeny f = 12.5 Hz | | Teeny f = 8.33 H | | Teeny f = 6.25 Hz | |
|  | PSNR | bitrate | PSNR | bitrate | PSNR | bitrate | PSNR | bitrate |
| QP = 10 | 32.78 | 816.41 | 32.63 | 534.99 | 32.50 | 399.85 | 32.42 | 331.58 |
| QP = 20 | 29.04 | 366.82 | 28.78 | 250.82 | 28.63 | 187.90 | 28.50 | 158.42 |

TABLE 6

|  | Renata f = 25 Hz | | Renata f = 12.5 Hz | | Renata f = 8.33 Hz | | Renata f = 6.25 Hz | |
| --- | --- | --- | --- | --- | --- | --- | --- | --- |
|  | PSNR | bitrate | PSNR | bitrate | PSNR | bitrate | PSNR | bitrate |
| QP = 10 | 29.49 | 915.78 | 29.50 | 554.89 | 29.46 | 402.94 | 29.44 | 339.50 |
| QP = 20 | 25.48 | 328.45 | 25.46 | 205.47 | 25.41 | 150.64 | 25.37 | 128.35 |
|  | Miss f = 25 Hz | | Miss f = 12.5 Hz | | Miss f = 8.33 Hz | | Miss f = 6.25 Hz | |
|  | PSNR | bitrate | PSNR | bitrate | PSNR | bitrate | PSNR | bitrate |
| QP = 10 | 37.30 | 138.95 | 37.25 | 80.92 | 37.22 | 62.69 | 37.15 | 51.67 |
| QP = 20 | 35.33 | 104.54 | 35.29 | 58.85 | 35.24 | 45.08 | 35.19 | 35.71 |
|  | Foreman f = 25 Hz | | Foreman f = 12.5 Hz | | Foreman f = 8.33 Hz | | Foreman f = 6.25 Hz | |
|  | PSNR | bitrate | PSNR | bitrate | PSNR | bitrate | PSNR | bitrate |
| QP = 10 | 32.74 | 329.88 | 32.58 | 220.99 | 32.54 | 164.16 | 32.45 | 143.11 |
| QP = 20 | 29.76 | 157.86 | 29.59 | 106.10 | 29.55 | 78.93 | 29.42 | 69.07 |
|  | Teeny f = 25 Hz | | Teeny f = 12.5 Hz | | Teeny f = 8.33 H | | Teeny f = 6.25 Hz | |
|  | PSNR | bitrate | PSNR | bitrate | PSNR | bitrate | PSNR | bitrate |
| QP = 10 | 32.80 | 754.48 | 32.64 | 510.76 | 32.52 | 383.14 | 32.45 | 317.99 |
| QP = 20 | 29.06 | 332.42 | 28.81 | 229.38 | 28.65 | 177.29 | 28.56 | 150.03 |

Macroblock Undersampling

To reduce further the number of computations, the case in which a ¼ pixel undersampling according to the version (c) is performed together with a macroblock undersampling has been tested. Macroblock undersampling means that the estimation is carried out on one half of the macroblocks of the estimated frame, chosen according to the usual checkerboard grid of FIG. 3. In particular in the case of two iterations (TR=3 and TR=4) the estimated macroblocks according to the two selectable sets of macroblocks according to the checkerboard scheme of FIG. 3 are alternated; even in the case of a single iteration (TR=1 and TR=2) the checkerboard selection is alternated for two successive picture to code. For macroblocks on which an estimation is not carried out, the "missing" vectors are determined by a median filtering on adjacent motion vectors already estimated, according to (6).

Figure 11:
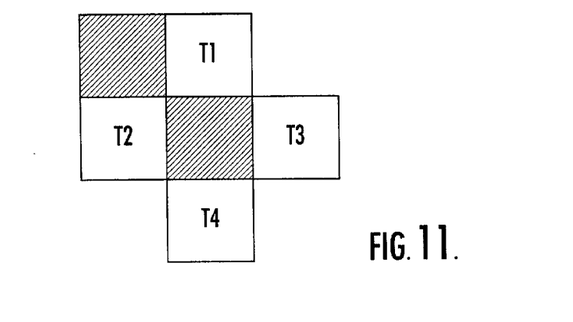
FIG. 11 shows the spatial position of spatio-temporal predictor candidates in a case of macroblock undersampling.

The advantage of alternating the undersampling grid is of avoiding that the interpolation is carried out always on the same macroblocks, thus trying to distribute uniformly among all blocks the perturbation introduced by the median filtering. The "missing" motion vector $d_m$ is determined as the median value among the horizontally adjacent vectors and the mean of the vertically adjacent ones. Its reconstruction is done only when the recursive estimation on all "black" macroblocks of one of the checkerboards of FIG. 3 has terminated. Thus there is the problem of which predictors must be examined when executing the recursive estimation, given that the spatial candidates at the left and on the top are not available. It has been opted to take the temporal predictors for the two critical positions, i.e. the temporal predictors produced with the estimation of the preceding frame. So, as it is possible to note from FIG. 11, there are four temporal candidates T1, T2, T3, T4 and a spatial candidate S1. The two random candidates and the predictor H.263 are then preserved; moreover the ½ pixel search is performed always with a full testing strategy on the eight positions surrounding the integer precision best candidate.

This solution, conjugating the macroblock undersampling to the ¼ pixel undersampling, is very advantageous in terms of computational saving. In fact the computational cost of a median filtering is definitely smaller than the one for a complete estimation with verification of the best integer precision predictors (in the worst case they are nine). The mean total PSNR and the bit-rate for the four test sequences are presented in table 7. If we compare these results with the ones in table 6, in which there is only a ¼ pixel undersampling, a worsening of the performance can be noted (smaller PSNR and larger bit-rate), but surprisingly such a worsening is of an entity that appears abundantly tolerable for low cost applications.

format of the examined pictures is CIF, i.e. 352×288 pixels. For recursive versions, the worse situation of predictor candidates cand=17 is adopted (9 with integer precision and 8 for half pixel refining).

From the calculations carried out, it has been obtained that: VR0 requires about 10.343 Mop for 1 iteration and 20.685 Mop for two iterations; VR1 requires about 2.587 Mop for 1 iteration and 5.175 Mop for two iterations; VR2 requires about 1.306 Mop for 1 iteration and 2.613 Mop for two iterations; and FS requires about 141.726 Mop. The VR2 solution is the one with the smallest number of computations: almost 8 times smaller than the VR0 solution. It require about one half of operations in respect to the case VR1, while the number of elementary operations, in the worst case of two iterations, is reduced by about 54 times in respect to the FS case.

Whenever the determining factor is the number of computations, the VR2 version would be preferred to the VR1 version with a slight degradation of the performance that remains undetected at a subjective level. If the computational complexity of VR1 is acceptable, one of the recursive versions, with only ¼ pixel undersampling, that pre-

TABLE 7

|  | Renata f = 25 Hz | | Renata f = 12.5 Hz | | Renata f = 8.33 Hz | | Renata f = 6.25 Hz | |
| --- | --- | --- | --- | --- | --- | --- | --- | --- |
|  | PSNR | bitrate | PSNR | bitrate | PSNR | bitrate | PSNR | bitrate |
| QP = 10 | 29.48 | 941.64 | 29.47 | 595.11 | 29.43 | 429.17 | 29.42 | 362.21 |
| QP = 20 | 25.45 | 337.31 | 25.40 | 221.21 | 25.37 | 160.97 | 25.31 | 139.00 |
|  | Miss f = 25 Hz | | Miss f = 12.5 Hz | | Miss f = 8.33 Hz | | Miss f = 6.25 Hz | |
|  | PSNR | bitrate | PSNR | bitrate | PSNR | bitrate | PSNR | bitrate |
| QP = 10 | 37.25 | 139.11 | 37.17 | 85.98 | 37.12 | 64.94 | 37.06 | 54.51 |
| QP = 20 | 35.21 | 102.41 | 35.10 | 59.77 | 35.05 | 44.90 | 34.92 | 36.71 |
|  | Foreman f = 25 Hz | | Foreman f = 12.5 Hz | | Foreman f = 8.33 Hz | | Foreman f = 6.25 Hz | |
|  | PSNR | bitrate | PSNR | bitrate | PSNR | bitrate | PSNR | bitrate |
| QP = 10 | 32.64 | 360.63 | 32.42 | 270.90 | 32.37 | 199.61 | 32.28 | 175.85 |
| QP = 20 | 29.61 | 167.04 | 29.29 | 124.95 | 29.25 | 94.28 | 29.08 | 83.54 |
|  | Teeny f = 25 Hz | | Teeny f = 12.5 Hz | | Teeny f = 8.33 H | | Teeny f = 6.25 Hz | |
|  | PSNR | bitrate | PSNR | bitrate | PSNR | bitrate | PSNR | bitrate |
| QP = 10 | 32.76 | 828.13 | 32.59 | 564.14 | 32.46 | 415.74 | 32.40 | 344.31 |
| QP = 20 | 28.96 | 365.90 | 28.68 | 259.30 | 28.54 | 194.95 | 28.42 | 163.53 |

Computational Complexity Calculation

The complexity is evaluated in terms of the number of elementary operations that a processor must carry out, assuming the availability of a SDRAM memory (Synchronous Dynamic Random Access Memory). Addition, subtraction and absolute value operations are supposed to cost one "elementary operation" (op), while multiplying, reading from and writing to require 3 op. Finally a weight value of 15 op is given to the median filtering that is performed in the recursive version with macroblock undersampling.

The comparison is carried out on the following versions: VR0, recursive estimation without any undersampling; VR1, recursive estimation with ¼ pixel estimation; VR2, recursive estimation with ¼ pixel and ½ macroblock estimations; and FS, full search estimation.

The cost of the three solutions is calculated, distinguishing in the recursive case between one and two iterations. The sents a better spatial quality together with a smaller bit-rate, with a certain QP would appear the best choice. By contrast the full search solution, even ensuring the best quality appears undoubtedly overburdening for real time communications, at least in the CIF format.

Figure 12:
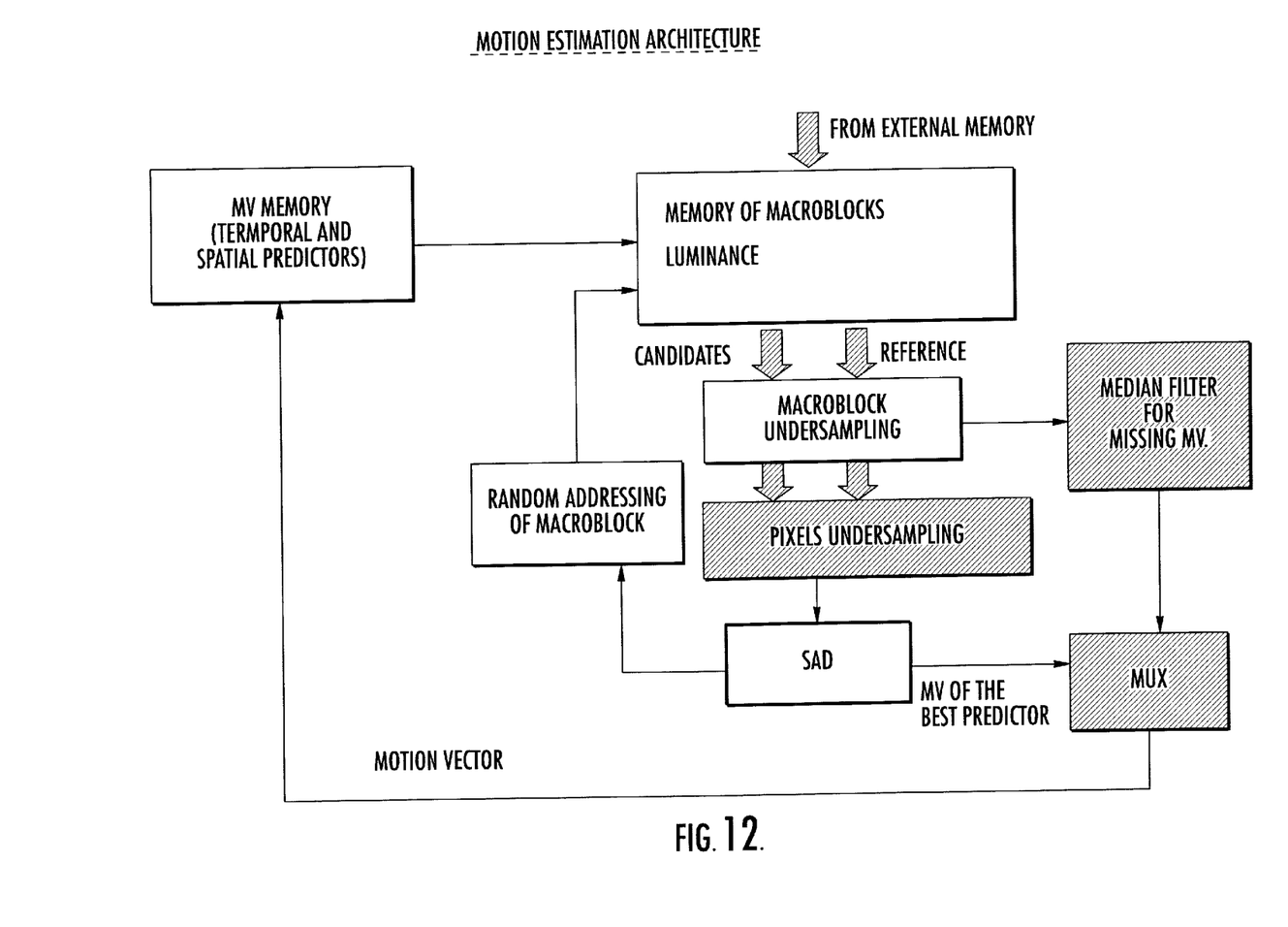
FIG. 12 shows a functional block diagram of the motion estimation architecture of the invention.

The architecture of the motion estimation of the invention is shown in the form of a functional block diagram in FIG. 12.

That which is claimed:

1. A method of motion estimation in an encoding system with prediction of motion compensated pictures comprising identifying a best predictor macroblock among pre-established prediction candidate macroblocks chosen among ones that are spatially distributed around or near a macroblock under estimation on a same frame and those that precede it according to an order of scanning used and among ones that are spatially/temporally distributed around or near the macroblock under estimation and that follow according to the order of scanning on picture frames that immediately temporally precede a frame to which the macroblock under estimation belongs, the method comprising the steps of:
- comparing predictor candidate macroblocks with each other to determine ones with different components;
- comparing values of pixels of a first candidate predictor macroblock with values of homologous pixels of a reference macroblock whose position on a reference frame corresponds to that of the macroblock under estimation on a current frame; and
- evaluating a cost function for each comparison with the reference macroblock, the best predictor macroblock producing a minimum value of the cost function;
- wherein the comparison with the reference macroblock and evaluation of the cost function are only performed for predictor macroblocks having different components.

2. A method according to claim 1 further comprising:
- choosing an update vector, from a plurality of pre-established update vectors, of smaller dimensions than the dimensions of a macroblock; and
- adding the update vector to each predictor macroblock candidate for accelerating a convergence process.

3. The method of claim 1, wherein the motion estimation is carried out with integer precision on the predictor macroblocks, and wherein a one-half pixel computational refinement is carried out on positions surrounding the best predictor macroblock from a preceding comparison.

4. The method of claim 1, wherein a further predictor macroblock, defined by the H.263 standard, is included in the chosen pre-established prediction candidate macroblocks.

5. The method of claim 1, wherein the evaluation of the cost function for each predictor macroblock is carried out on a reduced number of pixels of the macroblock chosen according to a checkerboard undersampling scheme with ¼ number of pixels.

6. The method of claim 1, wherein the motion estimation is carried out on a reduced number of macroblocks of each frame, alternately chosen according to a first checkerboard selection scheme and to a second checkerboard selection scheme of the macroblocks of temporally consecutive frames of a sequence, and further comprising operating a median filtering for determining a deselected macroblock of the current frame as median value among horizontally adjacent macroblocks and an average of macroblocks vertically near the deselected macroblock.

7. The method of claim 6, wherein according to the checkerboard selection schemes of macroblock undersampling, a single predictor continues to be a spatial predictor, while two spatial predictors become temporal predictors added to original temporal predictors.

8. The method of claim 6, wherein two iterations on a same pair of pictures are carried out if a frame-rate decreases, both pictures being scanned from top to bottom according to a common (scan-raster) scheme.

9. A method of motion estimation in an encoding system with prediction of motion compensated pictures comprising identifying a best predictor macroblock from among pre-established prediction candidate macroblocks chosen among ones that are spatially distributed around or near a macroblock under estimation on a same frame and those that precede it according to an order of scanning used and among ones that are spatially/temporally distributed around or near the macroblock under estimation and that follow according to the order of scanning on picture frames that immediately temporally precede a frame to which the macroblock under estimation belongs, wherein values of pixels of a first candidate predictor macroblock are compared with values of a homologous pixels of a reference macroblock whose position on a reference frame corresponds to that of the macroblock under estimation on a current frame, and a cost function is evaluated for each comparison with the reference macroblock, the best predictor macroblock producing a minimum value of the cost function, the method comprising the steps of:
- comparing predictor candidate macroblocks with each other to determine ones with different components; and
- performing the comparison with the reference macroblock and evaluation of the cost function only for predictor macroblocks having different components.

10. A method according to claim 9 further comprising:
- choosing an update vector, from a plurality of pre-established update vectors, of smaller dimensions than the dimensions of a macroblock; and
- adding the update vector to each predictor macroblock candidate for accelerating a convergence process.

11. The method of claim 9, wherein the motion estimation is carried out with integer precision on the predictor macroblocks, and wherein a one-half pixel computational refinement is carried out on positions surrounding the best predictor macroblock from a preceding comparison.

12. The method of claim 9, wherein a further predictor macroblock, defined by the H.263 standard, is included in the chosen pre-established prediction candidate macroblocks.

13. The method of claim 9, wherein the evaluation of the cost function for each predictor macroblock is carried out on a reduced number of pixels of the macroblock chosen according to a checkerboard undersampling scheme with ¼ number of pixels.

14. The method of claim 9, wherein the motion estimation is carried out on a reduced number of macroblocks of each frame, alternately chosen according to a first checkerboard selection scheme and to a second checkerboard selection scheme of the macroblocks of temporally consecutive frames of a sequence, and further comprising operating a median filtering for determining a deselected macroblock of the current frame as median value among horizontally adjacent macroblocks and an average of macroblocks vertically near the deselected macroblock.

15. An encoding system with prediction of motion compensated pictures comprising identifying a best predictor macroblock from among pre-established prediction candidate macroblocks chosen among ones that are spatially distributed around or near a macroblock under estimation on a same frame and those that precede it according to an order of scanning used and among ones that are spatially/temporally distributed around or near the macroblock under estimation and that follow according to the order of scanning on picture frames that immediately temporally precede a frame to which the macroblock under estimation belongs, wherein values of pixels of a first candidate predictor macroblock are compared with values of homologous pixels of a reference macroblock whose position on a reference frame corresponds to that of the macroblock under estimation on a current frame, and a cost function is evaluated for each comparison with the reference macroblock, the best predictor macroblock producing a minimum value of the cost function, the system comprising:
- means for comparing predictor candidate macroblocks with each other to determine ones with different components; and means for performing the comparison with the reference macroblock and the evaluation of the cost function only for predictor macroblocks having different components.

16. A system according to claim 15 further comprising:
means for choosing an update vector, from a plurality of pre-established update vectors, of smaller dimensions than the dimensions of a macroblock; and
means for adding the update vector to each predictor macroblock candidate for accelerating a convergence process.

17. The system of claim 15, wherein the motion estimation is carried out with integer precision on the predictor macroblocks, and wherein a one-half pixel computational refinement is carried out on positions surrounding the best predictor macroblock from a preceding comparison.

18. The system of claim 15, wherein a further predictor macroblock, defined by the H.263 standard, is included in the chosen pre-established prediction candidate macroblocks.

19. The system of claim 15, wherein the evaluation of the cost function for each predictor macroblock is carried out on a reduced number of pixels of the macroblock chosen according to a checkerboard undersampling scheme with ¼ number of pixels.

20. The system of claim 15, wherein the motion estimation is carried out on a reduced number of macroblocks of each frame, alternately chosen according to a first checkerboard selection scheme and to a second checkerboard selection scheme of the macroblocks of temporally consecutive frames of a sequence, and further comprising median filtering means for determining a deselected macroblock of the current frame as median value among horizontally adjacent macroblocks and an average of macroblocks vertically near the deselected macroblock.

* * * * *

UNITED STATES PATENT AND TRADEMARK OFFICE
CERTIFICATE OF CORRECTION

PATENT NO. : 6,483,928 B1
DATED : November 19, 2002
INVENTOR(S) : Daniele Bagni, Davide Giovenzana and Luca Pezzoni It is certified that error appears in the above-identified patent and that said Letters Patent is hereby corrected as shown below:

Column 1,
Line 59, delete "$(x_c - X/2 \leq x \leq x_c + x2)$" insert --$(x_c - X/2 \leq x \leq x_c + X/2)$--
Line 61, delete "$(y_c Y/2 \leq y \leq y_c + Y/2)$" insert --$(y_c - Y/2 \leq y \leq y_c + Y/2)$--

Column 2,
Line 22, delete "$US_f(b_c)=$" insert -- $US_r(b_c)=$ --
Line 50, delete "are show" insert -- are shown --
Line 56, delete " $d(b_c,t)=\{C \in CS | e(C,b_c,t) \leq e(V,b_c,t)) \, \forall (V \in CS(b_c,t))\}$ "
insert --$d(b_c,t) = \{C \in CS | e(C,b_c,t) \leq e(V,b_c,t) \forall (V \in CS(b_c,t))\}$--

Column 4,
Line 37, delete "where" insert -- were --
Line 58, delete "reduction the" insert -- reduction in the --

Column 7,
Line 45, delete "$T1 = d\left(b_c - \begin{pmatrix} -N \\ -Y \end{pmatrix}, t - T\right)$" insert --$T2 = d\left(b_c - \begin{pmatrix} -X \\ -Y \end{pmatrix}, t - T\right)$--

Column 8,
Line 56, delete "where" insert -- were --

Column 9,
Line 16, delete Table 3 and insert new Table 3 below:

| Sequence | F= 25Hz | F=12.5 Hz | F= 8.33 Hz | F = 6.25 Hz |
|---|---|---|---|---|
| Renata | 4.19 | 4.98 | 5.23 | 5.49 |
| Miss America | 5.02 | 5.42 | 5.82 | 5.90 |
| Foreman | 5.46 | 6.44 | 6.48 | 6.59 |
| Teeny | 5.85 | 6.41 | 6.54 | 6.58 |

UNITED STATES PATENT AND TRADEMARK OFFICE
CERTIFICATE OF CORRECTION

PATENT NO. : 6,483,928 B1
DATED : November 19, 2002
INVENTOR(S) : Daniele Bagni, Davide Giovenzana and Luca Pezzoni It is certified that error appears in the above-identified patent and that said Letters Patent is hereby corrected as shown below:

Column 10,
Line 9, delete "according the" insert -- according to the --
Line 20, delete "macroblocks" insert -- macroblock --
Table 4, (last line, fourth column) delete "26.86" insert -- 28.86 --

Column 14,
Line 13, delete "require" insert -- requires --

Signed and Sealed this

Fifth Day of August, 2003

JAMES E. ROGAN
*Director of the United States Patent and Trademark Office*